Jan. 24, 1961 R. BIRMANN 2,968,914

TURBOCHARGING OF INTERNAL COMBUSTION ENGINES

Filed July 6, 1955 4 Sheets-Sheet 1

INVENTOR.
RUDOLPH BIRMANN
ATTORNEYS

Jan. 24, 1961 R. BIRMANN 2,968,914
TURBOCHARGING OF INTERNAL COMBUSTION ENGINES
Filed July 6, 1955 4 Sheets-Sheet 2

INVENTOR.
RUDOLPH BIRMANN
BY
ATTORNEYS

INVENTOR.
RUDOLPH BIRMANN

Jan. 24, 1961 R. BIRMANN 2,968,914
TURBOCHARGING OF INTERNAL COMBUSTION ENGINES
Filed July 6, 1955 4 Sheets-Sheet 4

*INVENTOR.*
RUDOLPH BIRMANN
BY
ATTORNEYS

United States Patent Office 2,968,914
Patented Jan. 24, 1961

2,968,914

TURBOCHARGING OF INTERNAL COMBUSTION ENGINES

Rudolph Birmann, Newtown, Pa., assignor to De Laval Steam Turbine Company, Trenton, N.J., a corporation of New Jersey Filed July 6, 1955, Ser. No. 520,286

1 Claim. (Cl. 60—13)

This invention relates to the turbocharging of internal combustion engines, and has particular utility in the charging of two-cycle engines though the invention is more broadly applicable to engines of four-cycle type.

The turbocharging of two-cycle engines not equipped with any means for air supply to the engine other than the turbocharger involves problems in connection with the operation of the engine under conditions of idling and light engine loads. Under these operating conditions the temperature of the exhaust gases is low, which means that there is little energy available to the turbine for developing the power necessary to drive the compressor so that the air is delivered to the intake manifold at a pressure substantially higher than the turbine inlet pressure or the engine exhaust back pressure. The power deficiency of the turbocharger, however, is not great and it is only necessary to supply sufficient energy to the charger to overcome the power deficiency. Various attempts to overcome this deficiency have been made involving the addition of heat energy to the engine exhaust gases under idling conditions or the mechanical driving of the turbo compressor from the engine through gearing. The latter procedure is particularly unattractive, however, in view of the step-up gearing and the large gear ratio required to drive the compressor from the engine shaft. Typically, for example, the full speed of a turbo compressor may be around 37,500 r.p.m., and even under idling conditions the required speed may be of the order of 12,000 r.p.m. In contrast, diesel engines of large type operate only at relatively very low r.p.m.

In accordance with the present invention, the deficiency of power is supplied to the turbo compressor hydraulically by the utilization of an oil turbine of the Pelton wheel type. An oil pump driven by the engine supplies oil to the oil turbine nozzle at high pressure, the oil turbine being thus caused to operate at very high speeds despite the low speed of operation of the engine. The oil turbine drives the turbocharger only when required, and when its drive is unnecessary, the supply of oil may be cut off whereupon the oil turbine operates without any substantial loss of power.

Additionally, in accordance with the invention, there is simplified starting of the charging turbo compressor. Heretofore it has been necessary to start the turbo compressor essentially independently of the engine, using either air to drive the turbine, derived from the air supply utilized in starting the engine, or electrical starting means have been employed. In accordance with the present invention, the starting of the engine starts the turbo compressor through the hydraulic turbine system with the result that the turbo compressor is very rapidly brought up to the speed necessary to sustain operation of the engine. For example, with an engine operating normally at 1200 r.p.m., the oil turbine may be in full operation when the engine is operating at only 500 r.p.m.

The objects of the invention are the attainment of the ends just described and these as well as subsidiary objects relating particularly to details of construction and operation will become apparent from the following description read in conjunction with the accompanying drawings, in which.

Figure 1:
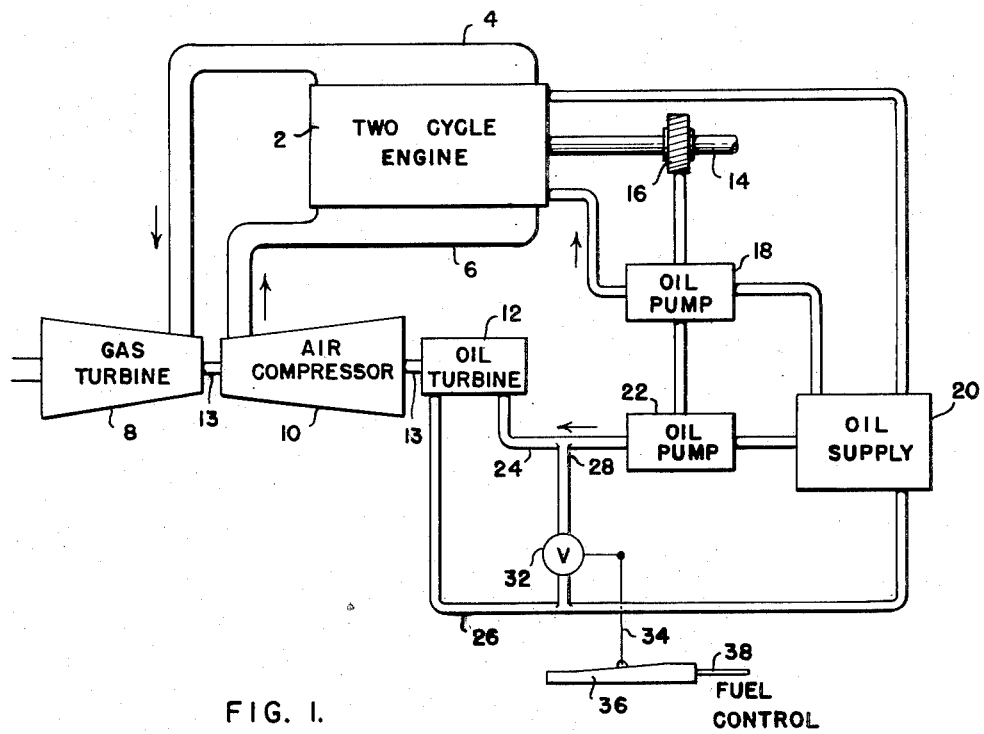
Figure 1 is a schematic diagram showing the relationships of the elements involved in the present invention.

Referring first to Figure 1, there is indicated at 2 a two-cycle engine which may, for purposes of description, be considered to be a diesel engine operating with relatively low shaft speed, for example, at 500 r.p.m. under idling and starting conditions and at 1200 r.p.m. under full load conditions. While a two-cycle engine will be particularly referred to, it will be evident that the invention is applicable to four-cycle engines. The two-cycle engine, however, involves special problems in that it is not self-operating, requiring a scavenging air supply which will provide an intake pressure in excess of the exhaust back pressure at all times. The engine 2 is provided with an exhaust manifold indicated at 4 and an intake manifold indicated at 6.

The turbo compressor provided for scavenging and supercharging is diagrammatically indicated in Figure 1 as comprising an exhaust gas turbine 8 and an air compressor 10 having a common shaft 13. Desirably, however, instead of two separate units forming the gas turbine and air compressor there is used a monorotor arrangement in which gas turbine passages and air compressor passages are provided on a common rotor as described in my applications Serial Nos. 108,975, filed August 6, 1949 (now U.S. Patent No. 2,709,893), 360,500, filed June 9, 1953, and 428,627, filed May 10, 1954. The present invention is not concerned with the details of the turbocompressor, nor of its particular association with the engine, but the turbo-compressor unit is desirably of high efficiency type embodying such features of both construction and association with the engine as are set forth in the foregoing applications.

In Figure 1 the shaft 13 is shown as connected to an oil turbine 12 the details of which will be described hereafter. The engine shaft 14 drives through the usual gearing 16 the lubricating oil pump 18, and in accordance with the present invention this same drive operates a positive displacement oil pump 22. Desirably, this pump is separate from the lubricating oil pump since, whereas the latter may be required to supply oil at only relatively low pressures, the pump 22 which drives the oil turbine 12 must provide oil at relatively high pressures of the order of 250 pounds per square inch. The particular type of pump used is not material so long as it supplies oil at adequate pressure, and it may be of a positive displacement gear or screw type. The oil pumps draw their oil from a supply tank 20 to which the oil returns after use. The oil pump 22 delivers its high pressure oil through connection 24 to the turbine 12 and the oil returns from the turbine to the oil supply tank through connection 26.

Figure 7:
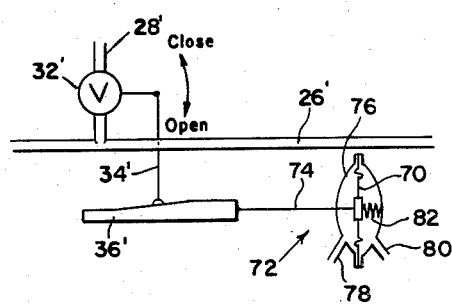
Figure 7 is a schematic diagram, showing the regulation of the hydraulic turbine controlling valve in response to the difference between the intake and exhaust manifold pressures.

Control of the oil supply may be effected in various fashions of which one is illustrated in Figure 1. A bypass 28 is provided between the supply and exhaust lines 24 and 26 and this bypass includes a valve 32. The valve 32 is shown as controlled through mechanical connection indicated at 34 from a cam 36 carried by the usual fuel control rack 38 controlling the supply of fuel to the engine. The connection between the valve 32 and fuel rack 38 is such that movement of the rack in a direction to increase the fuel consumption tends to open the valve, and movement of the rack in the opposite direction (i.e. toward the idling position) produces the opposite effect of closing the valve. It will be obvious, however, that various other controls may be provided with the objective of securing proper supply of oil to the oil turbine 12 when it is required to deliver power while cutting off the oil supply when power is not required and it is desired to have the wheel of the oil turbine rotate freely. For example, the bypass valve 32 could be operated by a diaphragm responsive to the difference between intake and exhaust manifold pressures so that oil pump 22 would deliver oil to the oil turbine if this pressure difference falls below a certain minimum at which the engine would not operate and the turbocharger must therefore be aided. Such an arrangement is illustrated in Figure 7, wherein the various parts identified by primed (') reference numerals correspond to parts bearing the same numerals in Figure 1. The cam 36' is connected to the diaphragm 70 of a pressure differential responsive device 72 by a link 74. The device 72 has a housing 76 defining chambers at opposite sides of diaphragm 70, and the chamber at the left side (Figure 7) of the diaphragm is connected to the intake manifold (not shown) by a conduit 78. Similarly, the chamber at the other side, or right side, of the diaphragm 70 is connected to the exhaust manifold by a conduit 80. A spring 82 normally maintains the diaphragm 70 in an intermediate position. If the difference between the intake and exhaust manifold pressures drops below normal, indicating an increase in load, diaphragm 70 will move cam 36' to the left (Figure 7), causing the same to move valve 32' toward its closed position. Upon an increase in said pressure difference, the effect is the opposite, namely, valve 32' is moved toward its open position.

Figure 2:
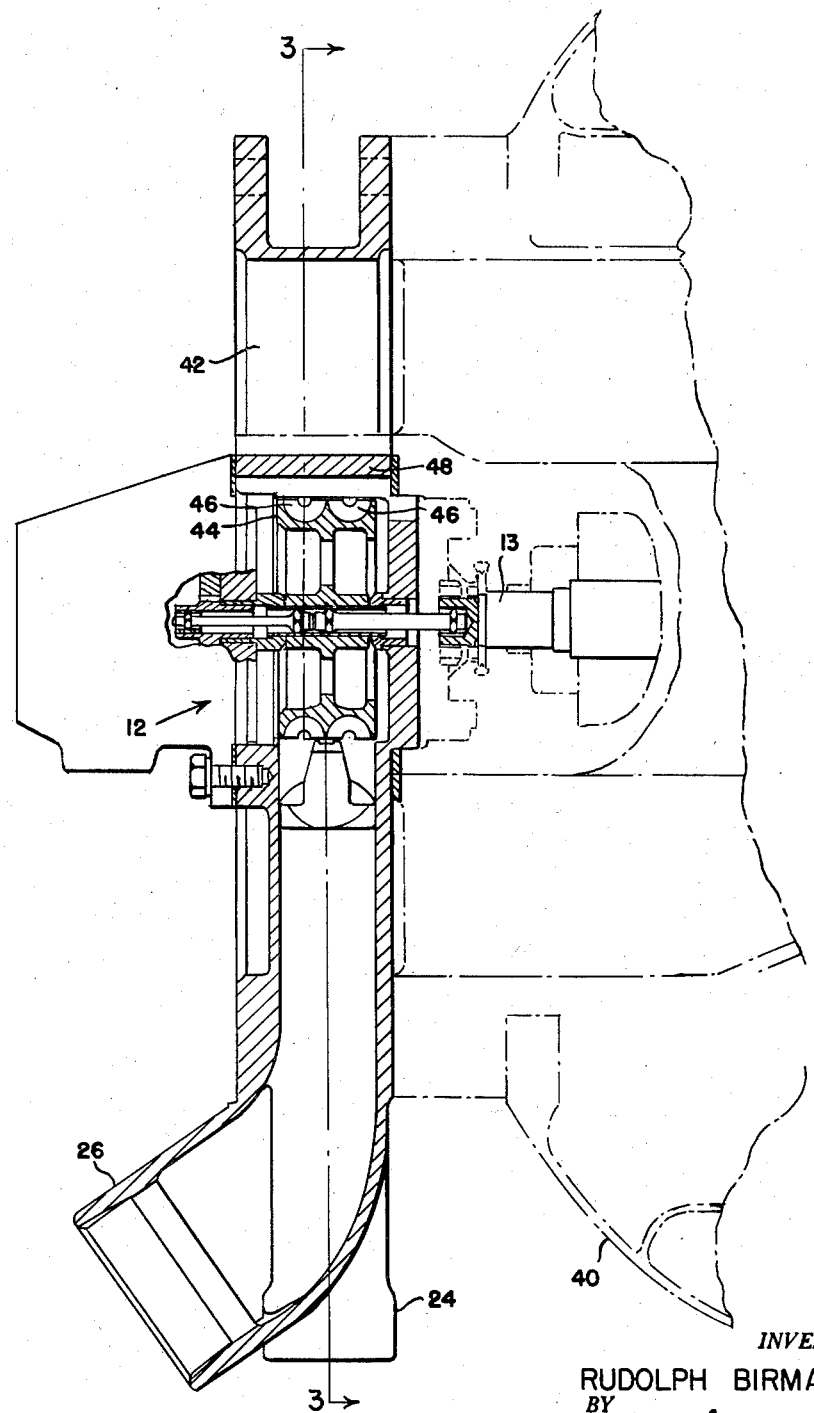
Figure 2 is a vertical section through the oil turbine, showing in phantom form its association with a turbo compressor, the section being taken on the plane indicated at 2—2 in Figure 3.

Referring to Figure 2, there is indicated in phantom outline at 40 the casing of the compressor end of the turbo compressor, the compressor receiving its air through passages indicated at 42. In the preferred arrangement, following the disclosures of the applications referred to above, the rotor is common to both the gas turbine and air compressor, the arrangement being of the monorotor type, suitable housings being provided at 40.

The rotor (Pelton wheel) of the oil turbine is indicated at 44 and is provided with driving buckets 46 which may be milled in the periphery of the rotor. The rotor is housed in a casing 48 which has communication with the supply and exhaust lines 24 and 26. Indicative of the simplicity of the oil turbine involved, reference may be made to the fact that in a typical installation the rotor 44 may be only 3 inches in diameter, being designed for a range of power operation at speeds from 12,000 to 40,000 r.p.m. and capable of delivering upwards of two horsepower at these speeds.

Figure 3:
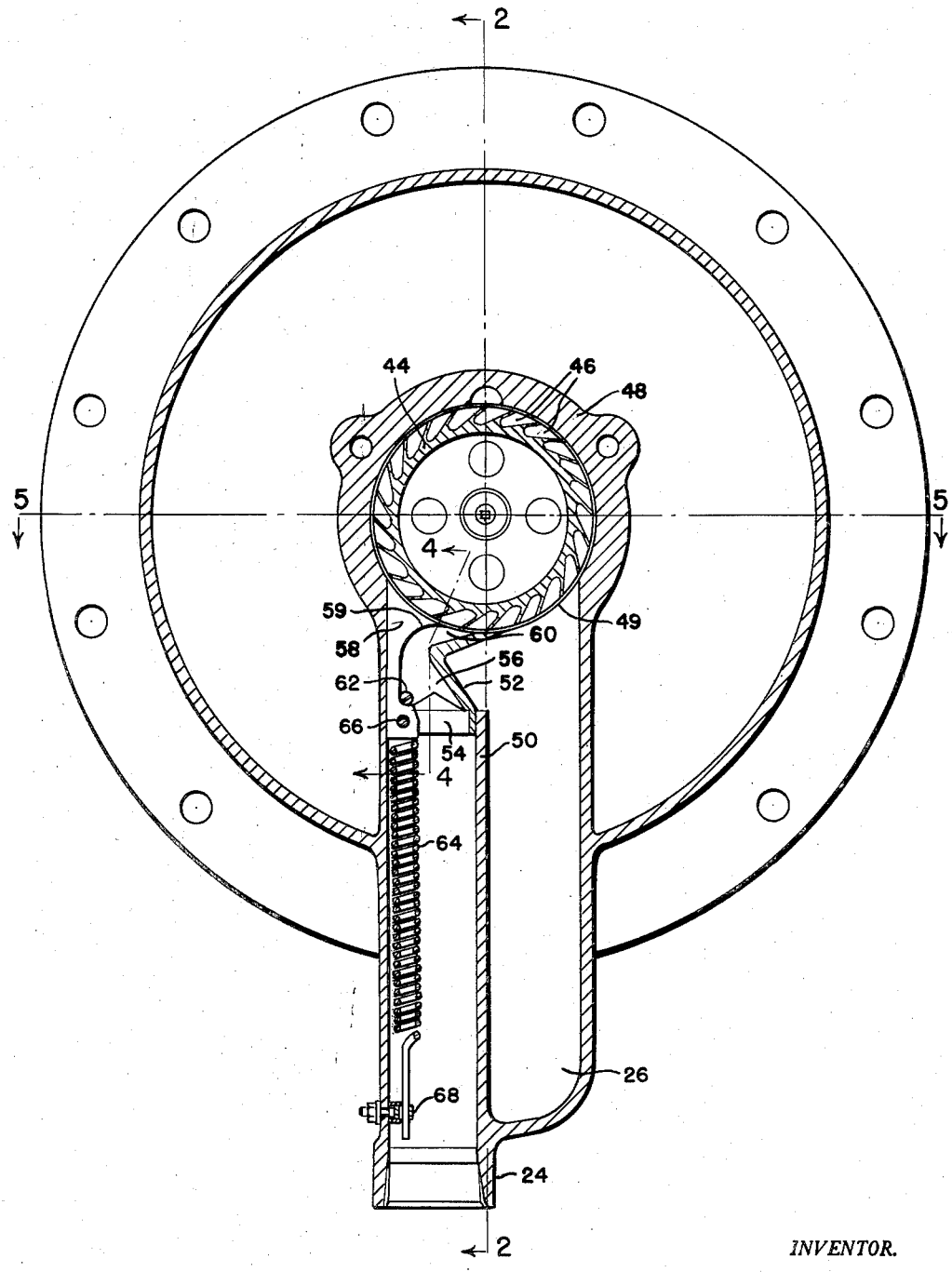
Figure 3 is a vertical section taken on the plane indicated at 3—3 in Figure 2.
Figure 5:
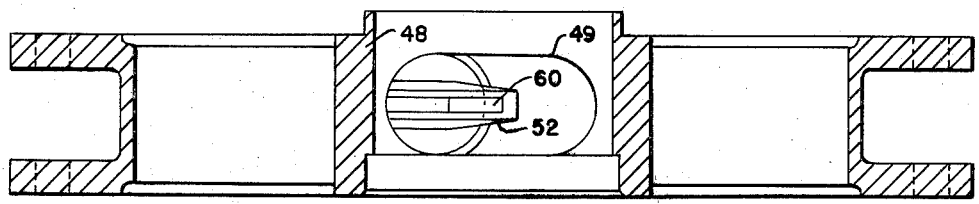
Figure 5 is a horizontal section taken on the plane indicated at 5—5 in Figure 3.
Figure 4:
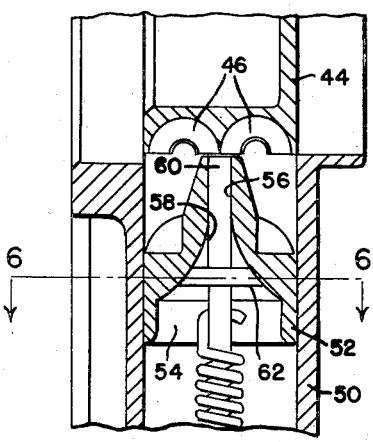
Figure 4 is a fragmentary section taken on the broken surface indicated at 4—4 in Figure 3.
Figure 6:
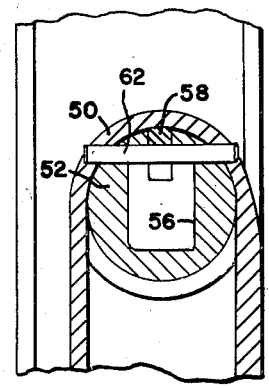
Figure 6 is a fragmentary section taken on the plane indicated at 6—6 in Figure 4.

Referring to Figures 2 and 3, in its approach to the turbine wheel the supply passage 24 is formed as a tube 50 in the upper end of which there is located the nozzle body 52 which is bored at 54 and provided with an opening at 56 which terminates adjacent the wheel 44 in a rectangular slot 60 which provides the nozzle to feed oil to the buckets 46. Guided within the slot provided at 60 and a vertical extension 56 thereof, as indicated in Figure 6, there is a movable member 58 which is shaped at 59 to provide proper guidance for the oil to provide a driving jet. The member 58 is limited in its upward movement by a pin 62 which also serves to lock the member 52 in the upper end of the tube 50. A spring 64 has its upper end connected to the member 58 at 66 and has its lower end adjustably anchored at 68. The spring 64 is in tension and normally tends to move the member 58 downwardly to close off the nozzle passage at 60.

Starting of the engine may be effected in any usual fashion, as by the use of a compressed air supply, through the use of a starting motor, or the like. As the engine is started the oil is supplied through connection 24 and serves by its pressure to open the nozzle by moving the member 58 upwardly against the spring 64. The spring, however, controls the opening so as to maintain the nozzle opening at a position proper, in view of the quantity of oil supplied, to provide sufficient pressure to maintain a jet of required velocity for full operation of the turbine. As a result of these matters, the oil turbine rapidly brings the turbo compressor up to operating speed, say 12,000 r.p.m., so that the compressor supplies sufficient air for sustained operation of the engine, effecting proper scavenging by maintenance of intake pressure in excess of the exhaust back pressure.

Following starting, the valve 32, Figure 1, under control of the fuel rack takes over the control of the oil supply to the turbine by varying the bypass. Under idling conditions the valve 32 is maintained relatively closed so that a sufficient quantity of oil is delivered to the turbine to supply any deficiency in the power supply from the exhaust gases of the engine to the gas turbine 8. With the engine idling at 500 r.p.m., for example, the oil turbine and compressor (and gas turbine) may operate at around 12,000 r.p.m. which is sufficient to supply the required air, making up for the deficiency in power available from the exhaust gases.

Under light load conditions, though more fuel is supplied to the engine, its exhaust gases may still require the provision of power through the oil turbine to maintain proper operation, and this occurs, though the bypass 32 may be opened somewhat beyond the idling position. The automatic operation of the member 58 in response to oil pressure insures that an adequate jet velocity of the oil is provided by the nozzle. Under higher loads less power input is required from the oil turbine and there will ultimately occur a condition in which no power is required from this turbine. By the corresponding shaping of the cam 36, the valve 32 may then be fully opened, removing oil pressure from the passage 24 whereupon the member 58 may substantially close off the supply of oil to the turbine which then operates idly and without any substantial loss of power. If complete shut off of oil flow to the oil turbine is desired, an additional valve may be provided to close off flow through connection 24. Under these idling conditions the rotor 44, of course, rotates with the turbo compressor at speeds ranging up to the full speed of the turbo compressor.

It will be evident from the foregoing that there is provided an extremely simple and inexpensive arrangement for supplying power to the turbo compressor under all conditions in which auxiliary power is required. No gearing is required between the engine and the supercharger nor is there required any addition of fuel to the engine exhaust gases to render them capable of supplying the necessary energy to the gas turbine. The same oil as is used for lubrication of the engine may be used for the oil turbine drive. Since the turbine wheel may operate at full gas turbine speed, there is no necessity for provision of any overrunning clutch arrangement.

While the invention has been particularly described in its application to the scavenging and supercharging of two-cycle engines, it will be evident that it may be used in conjunction with four-cycle engines to supply additional energy for the drive of the turbo charger under idling or other low load conditions.

What is claimed is:

In combination, an internal combustion engine, a gas turbine receiving exhaust gases from the engine, a compressor driven by the gas turbine and supplying air to the engine, a liquid-operated turbine operatively connected to drive said compressor, a liquid pump driven by the engine and supplying driving liquid for said liquid-operated turbine, said liquid-operated turbine including a nozzle automatically adjusted in response to the pressure of the driving liquid to maintain jet velocity of the driving liquid, and means responsive to the load on the engine for controlling flow of driving liquid to said nozzle, said means tending to control said flow inversely with changes in load.

References Cited in the file of this patent

UNITED STATES PATENTS

| 197,949 | Swartz | Dec. 11, 1877 |
| 330,753 | Trullinger | Nov. 17, 1885 |
| 2,731,792 | Nallinger | Jan. 24, 1956 |

FOREIGN PATENTS

| 488,396 | Great Britain | July 6, 1938 |